No. 757,608. PATENTED APR. 19, 1904.
F. J. FEWINGS.
CAR OR ENGINE REPLACER.
APPLICATION FILED JUNE 17, 1903.
NO MODEL. 2 SHEETS—SHEET 2.
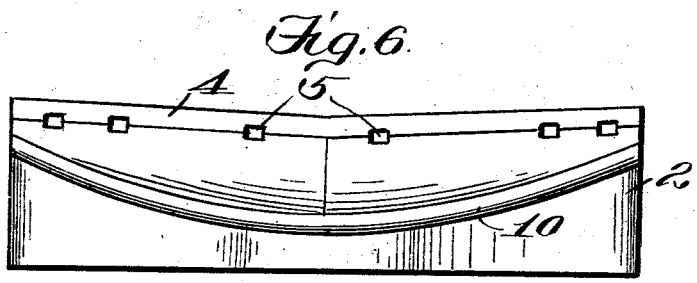
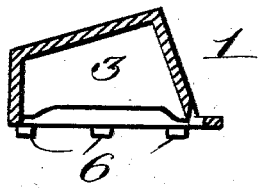
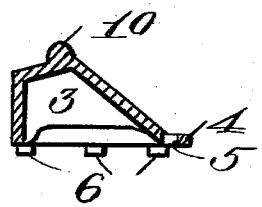
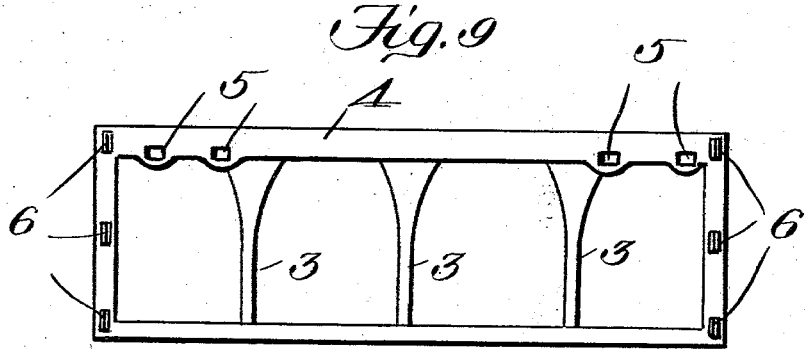
Witnesses:
Inventor
Frederick J. Fewings
By James L. Norris
Atty.

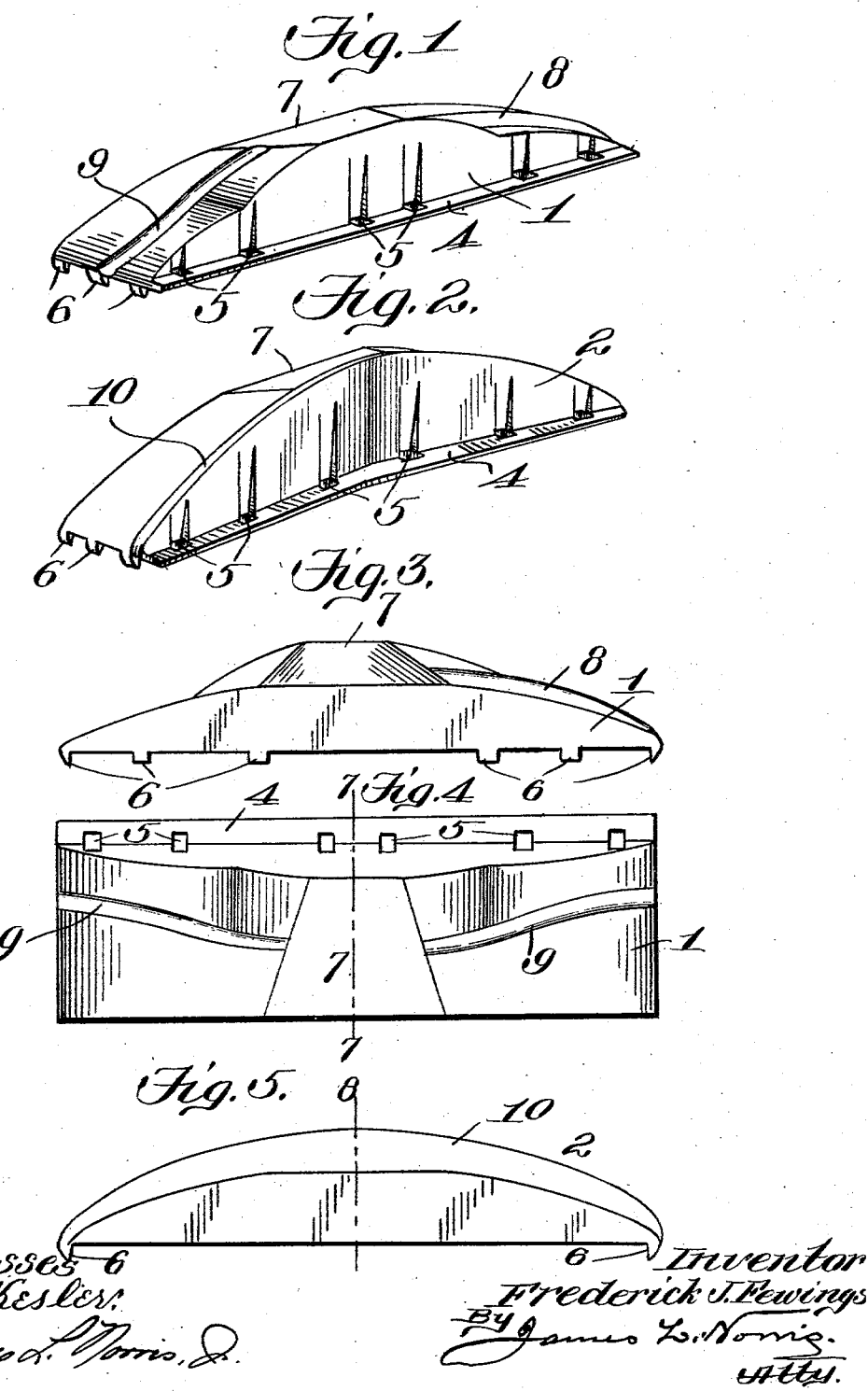

No. 757,608. Patented April 19, 1904.

UNITED STATES PATENT OFFICE.

FREDERICK J. FEWINGS, OF DULUTH, MINNESOTA.

CAR OR ENGINE REPLACER.

SPECIFICATION forming part of Letters Patent No. 757,608, dated April 19, 1904.

Application filed June 17, 1903. Serial No. 161,940. (No model.)

*To all whom it may concern:*

Be it known that I, FREDERICK J. FEWINGS, a citizen of the United States, residing at Duluth, in the county of St. Louis and State of Minnesota, have invented new and useful Improvements in Car or Engine Replacers, of which the following is a specification.

This invention relates to certain new and useful improvements in car and engine replacers.

The invention aims to construct a car and engine replacer comprising an outer and an inner replacing-block which when set up will not turn over or jump out of place when struck by the car or engine wheels and are adapted to lower the wheels gradually toward and upon the rails, overcoming thereby any rapid sliding of the wheels in a lateral direction, consequently preventing the landing of the wheels with a sudden jar upon the rails.

The invention further aims to construct a car and engine replacer which will replace the car or engine whether it is run forward upon or backed upon the replacer, or, in other words, the construction of the replacer being such that it will accomplish its purpose whether the car or engine is run forward or backward upon the replacer.

The invention further aims to construct a replacer so that its elevation will be gradual, thereby preventing any jerk or lurch of the drivers or trucks when climbing the frog, and, furthermore, construct a replacer so that it will be impossible for the wheel to directly pass over it without going onto the rail, thereby preventing any damage to the ties, track, or equipment.

The invention further aims to construct a car and engine replacer which shall be extremely simple in its construction, strong, durable, efficient in its use, and comparatively inexpensive to manufacture.

With the foregoing and other objects in view the invention consists of the novel combination and arrangement of parts hereinafter more specifically described, illustrated in the accompanying drawings, and particularly pointed out in the claims hereunto appended.

In describing the invention in detail reference is had to the accompanying drawings, forming a part of this specification, wherein like reference characters denote corresponding parts throughout the several views, and in which—

Figure 1 is a perspective view of the outer replacing-block. Fig. 2 is a like view of the inner replacing-block. Fig. 3 is a side elevation of the outer replacing-block. Fig. 4 is a top plan view of the outer replacing-block. Fig. 5 is a side elevation of the inner replacing-block. Fig. 6 is a top plan view of the inner replacing-block. Fig. 7 is a vertical section on line 7 7 of Fig. 4. Fig. 8 is a vertical section on line 8 8 of Fig. 5; and Fig. 9 is an inverted plan view of one of the blocks, showing the arrangement of the strengthening-ribs.

Referring to the drawings by reference characters, 1 denotes the outer replacing-block, and 2 the inner replacing-block. The former when in position is adapted to be arranged at the outside of and abut against the rail and is of such height at both sides thereof as to suitably extend above the rail, and the inner replacing-block 2 is adapted to be arranged at the inside of and abut against the other rail of the track and is of such height as to suitably extend at one side above the rail and at its opposite side below the tread of the rail. The function of constructing the blocks of the height referred to above will be hereinafter described in the operation of replacing a car or engine.

Each of the blocks 1 2 is constructed, preferably, of cast-steel and of shell-like formation with an open bottom, and each is provided with a plurality of braces 3, extending transversely thereof and terminating in the inner face of the inner wall of the block. The braces 3 from their medial line on both sides converge outwardly toward the inner wall of the block, which increases the thickness of the braces at its point. The braces 3 at their tops are integral with the inner face of the top wall of the block. The thickened portion of the braces 3 lies below that portion of the top of the block upon which the weight is during the operation of replacing a car or engine, the thickened portion then of the braces thereby increasing the strength of that portion of the top of the block upon which the most weight is during the operation of replacing a car or engine. The inner wall of the blocks is that which lies parallel to the rail. This manner of constructing the braces 3 strengthens the blocks to such an extent that it will make the breaking of the blocks almost impossible.

The inner side wall of the blocks 1 2—that is, the wall which lies parallel with the rails—extends in a vertical manner, and the other wall extends upwardly and inwardly at an inclination, this wall being what is termed the "outer" wall.

The reference-numeral 4 denotes an outwardly-extending flange integral with the bottom of the outer wall 9 of each of the blocks and has formed therein a series of openings 5, registering with a series of recesses formed by the depressed portions 5 in the outer wall of each of the blocks. The recesses and openings are adapted to receive spikes or other suitable fastening means which engage in the sleepers of the tracks for securing the blocks thereto when arranged in their operative positions. The flanges 4 when the blocks are set up are adapted to rest on the base of the rail-sections of the track and will aid the replacer very much with its work, owing to the fact that it enables the blocks to be placed close to the tread of the rail-sections at the same time the base of the sections acts as support for said flanges.

The lower face of each of the blocks 1 2 is provided with a series of feet or spurs projecting therefrom, as at 6, preferably octagonal in contour, although any other shape may be employed, and these feet or spurs are adapted to pierce the ties, thereby further holding the replacer-blocks rigidly in position.

The blocks 1 2 are substantially segmental in contour, and approximately centrally of the upper face of each of the blocks is an inclined offset 7, the inclination of the said offset being downwardly from the outer side to the inner side of the blocks.

The block 1 has its upper surface at one side of its offset 7 provided with a rib 8. The rib 8 starts from one end of the upper surface of the block 1 and terminates at its upper end into one side of the offset 7 of the block 1. The other side of the top surface of the block 1 is provided with a groove 9, which extends from one side of the offset 7 of the block 1 to the end of the block. The rib 8 and groove 9 are shown in Figs. 1 and 4. The rib 8 is substantially segmental in contour in the direction of its length, and the groove 9 extends in a like manner. The replacing-block 2 has its top provided at the outer side thereof with a rib 10, projecting a suitable distance above the upper surface of the block 2 and extending from one end of the block to the other. The rib 8, groove 9, and rib 10 are adapted to prevent the slipping off of the wheels of the car or engine when riding the blocks—that is to say, preventing the wheels from slipping off laterally over the outer edge of the blocks. The rib 8 extends at an inclination toward the inner edge of the block 1, and the groove 9 extends in a like manner. The rib 8 and groove 9 may be stated as extending in a diagonal direction toward the inner edge of the replacing-block 1. The rib 10 of the block 2 extends diagonally upward toward the center of the outer edge of said block and then downwardly and outwardly to the corner at the opposite end of the block 2, or, in other words, the rib 10 extends substantially in the same manner as the rib 8 and groove 9. The rib 8 and groove 9 are adapted to aid the rib 10 on the inside replacer and divide the strain on the wheel-flanges between the two wheels instead of leaving all the strain on the rib 10, as would be the case without the employment of the rib 8 and groove 9, and this construction is specially adapted for the heavy class of equipments now coming into general use. Furthermore, from constructing and arranging the groove 9 and rib 8 in the manner as set forth they will gradually force the wheel to one side, and at the same time the weight will be gradually distributed by the ball of the wheel resting on the rib 8 or into the groove 9.

From the foregoing description it will be apparent that when the blocks are placed against the rail and the weels are advanced upon them as soon as the wheels approach the inclined offset of the blocks the inclination thereof will cause the wheels to slide from and upon the rails, the rib 8 or groove 9 and rib 10 materially assisting in causing the wheels as they mount the blocks to move toward the rails, the diagonal manner in which the rib 8 or groove 9 and rib 10 extend performing the function just stated.

It is thought the many advantages of my new and improved car or engine replacer can be readily understood from the foregoing description, taken in connection with the accompanying drawings, and it will, furthermore, be evident that changes, variations, and modifications can be resorted to without departing from the spirit of the invention or sacrificing any of its advantages, and I therefore do not wish to restrict myself to the details of construction hereinbefore described and as shown in the accompanying drawings, but reserve the right to make such changes, variations, and modifications as come properly within the scope of the protection prayed.

Having thus fully described my invention, what I claim as new, and desire to secure by Letters Patent, is—

1. A car and engine replacer comprising an inner and an outer replacing-block substantially segmental in contour and each having its upper surface provided with an inclined offset, the inclination of the offset being downwardly from the outer to the inner side of its respective block and the said offset further converging inwardly toward its inner end, and a rib formed upon the upper surface of each of said blocks, each of said ribs substantially segmental in contour in the direction of its length and extending diagonally toward the inner side of its respective block, said ribs cooperating with each other during the operation of replacing.

2. A replacer-block having a rib on its upper surface, said rib substantially segmental in contour in the direction of its length, extending diagonally of the upper surface of and toward the inner side of said block, and said block further provided with a groove in its upper surface said groove formed in the upper surface of the block at a point removed from said rib and said groove extending in a segmental manner in the direction of its length and extending diagonally toward the inner side of the block.

3. A replacer-block having its upper surface provided with an inclined offset, the inclination thereof being downwardly from the outer to the inner side of the block, said block having its upper surface further provided with a rib substantially segmental in contour in the direction of its length and extending diagonally toward the inner side of the block and terminating in said offset at one side thereof.

4. A replacer-block having its upper surface provided with an inclined offset, the inclination thereof being downwardly from the outer to the inner side of the block, said block having its upper surface further provided with a rib substantially segmental in contour in the direction of its length and extending diagonally toward the inner side of the block and terminating in said offset at one side thereof, said block having its upper surface further provided with a groove extending in a segmental manner in the direction of its length and extending diagonally toward the inner side of the block and terminating in said offset at the other side thereof.

5. A replacer-block having its upper surface provided with an inclined offset, the inclination thereof being downwardly from the outer to the inner side of said block and the said offset further converging inwardly toward its inner end, said block having its upper surface further provided with a rib substantially segmental in contour in the direction of its length and extending diagonally toward the inner side of the block and terminating in said offset at one side thereof.

6. A replacer-block having its upper surface provided with an inclined offset, the inclination thereof being downwardly from the outer to the inner side of said block and the said offset further converging inwardly toward its inner end, said block having its upper surface further provided with a rib substantially segmental in contour in the direction of its length and extending diagonally toward the inner side of the block and terminating in said offset at one side thereof, said block having its upper surface further provided with a groove extending in a segmental manner in the direction of its length and extending diagonally toward the inner side of the block and terminating in said offset at the other side thereof.

7. An outer replacer-block having its upper surface provided with an inclined offset, the inclination thereof being downwardly from the outer to the inner side of said block, said block further provided on its upper surface with a rib extending diagonally in opposite directions and toward the inner side of said block, said rib of a length equal to that of the length of the block.

8. A replacer-block having its upper surface provided with an inclined offset, the inclination thereof being downwardly from the outer to the inner side of said block and the said offset further converging inwardly toward its inner end, said block further provided on its upper surface with a rib substantially segmental in contour in the direction of its length and extending diagonally in opposite directions toward the inner side of said block.

9. A replacer-block having its upper surface provided with a rib substantially segmental in contour in the direction of its length, extending diagonally of the upper surface of and toward the inner wall of said block, said block having its inner wall recessed and terminating at its bottom in a laterally-extending flange provided with cut-away portions registering with said recesses and forming thereby openings through which extend holdfast devices.

10. A replacer-block having its upper surface provided with a rib substantially segmental in contour in the direction of its length, extending diagonally of the upper surface of and toward the inner wall of said block, said block having its inner wall recessed and terminating at its bottom in a laterally-extending flange provided with cut-away portions registering with said recesses and forming thereby openings through which extend holdfast devices, said block further provided with depending fastening-spurs.

11. A replacer-block having a portion of its upper surface provided with a groove substantially segmental in contour in the direction of its length, extending diagonally of the upper surface and toward the inner wall of said block, said block having its inner wall recessed and terminating at its bottom in a laterally-extending flange provided with cut-away portions registering with said recesses and forming thereby openings through which extend holdfast devices.

12. A replacer-block having a portion of its upper surface provided with a groove substantially segmental in contour in the direction of its length extending diagonally of the upper surface of and toward the inner wall of said block, said block having its inner wall recessed and terminating at its bottom in a laterally-extending flange provided with cut-away portions registering with said recesses and forming thereby openings through which extend holdfast devices, said block further provided with depending fastening-spurs.

13. A replacer-block having a groove in its upper surface substantially segmental in the direction of its length and extending diagonally toward the inner wall of the block, said groove terminating at a point adjacent to the center of the block and the inner wall thereof.

14. A replacer-block having a rib on its upper surface substantially segmental in the direction of its length and extending diagonally toward the inner wall of the block, said rib terminating at a point adjacent to the center of the block and the inner wall thereof.

15. A replacer-block of shell-like formation provided with a plurality of interiorly-arranged transversely-extending strengthening-braces integral with the lower face of its top wall and with the inner face of its side walls, said braces having their inner sides of greater thickness than their outer sides, said block further provided in its upper surface with a groove substantially segmental in the direction of its length and extending diagonally toward the inner wall of the block, said groove terminating at a point adjacent to the center of the block and the inner wall thereof.

16. A replacer-block of shell-like formation provided with a plurality of interiorly-arranged transversely-extending strengthening-braces integral with the lower face of its top wall and with the inner face of its side walls, said braces having their inner sides of greater thickness than their outer sides, said block further provided in its upper surface with a rib substantially segmental in the direction of its length and extending diagonally toward the inner wall of the block, said rib terminating at a point adjacent to the center of the block and the inner wall thereof.

In testimony whereof I have hereunto set my hand in presence of two subscribing witnesses.

FREDERICK J. FEWINGS.

Witnesses:
OTTO L. MANTHEY,
EDWARD B. RYAN, Jr.